(12) United States Patent
He (10) Patent No.: US 8,204,101 B2
(45) Date of Patent: Jun. 19, 2012

(54) NOISE ESTIMATION APPARATUS AND RELATED METHOD THEREOF

(75) Inventor: Wei-Hung He, Kaohsiung (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 434 days.

(21) Appl. No.: 12/624,424

(22) Filed: Nov. 24, 2009

(65) Prior Publication Data

US 2010/0128769 A1 May 27, 2010

(30) Foreign Application Priority Data

Nov. 26, 2008 (TW) .............................. 97145649 A (51) Int. Cl.
*H04B 17/00* (2006.01)

(52) U.S. Cl. ...................................... 375/227

(58) Field of Classification Search .................. 375/227, 375/340, 346, 350
See application file for complete search history.

(56) References Cited

U.S. PATENT DOCUMENTS

| | | | |
|---|---|---|---|
| 7,397,871 B2 * | 7/2008 | Wiss et al. ..................... | 375/340 |
| 7,433,395 B2 * | 10/2008 | Sedarat ......................... | 375/222 |
| 7,558,337 B2 * | 7/2009 | Ma et al. ....................... | 375/316 |
| 7,583,755 B2 * | 9/2009 | Ma et al. ....................... | 375/316 |
| 7,668,269 B2 * | 2/2010 | Ma et al. ....................... | 375/350 |

\* cited by examiner

*Primary Examiner* — Khanh C Tran (74) *Attorney, Agent, or Firm* — Winston Hsu; Scott Margo (57) ABSTRACT

A noise estimation apparatus and method thereof includes an evaluation circuit, a first calculation circuit, a second calculation circuit, and a mean calculation circuit. The evaluation circuit is utilized for determining which constellation point on a constellation diagram each received symbol in a communication signal corresponds to for purposes of generating a relevant evaluated symbol and outputting an evaluated signal. The first calculation circuit is for generating an error output signal according to the communication signal and the evaluated signal, wherein the error output signal includes a plurality of error calculation values. The second calculation circuit is utilized for adjusting at least a portion of the plurality of error calculation values of the error output signal in order to output an adjusted error output signal. The mean calculation circuit is utilized for averaging the adjusted error output signal in order to generate a noise estimation result.

14 Claims, 6 Drawing Sheets

NOISE ESTIMATION APPARATUS AND RELATED METHOD THEREOF

BACKGROUND OF THE INVENTION

1. Field of the Invention

The present invention relates to a noise estimation scheme in a communication system, and more particularly to a noise estimation apparatus and related method thereof that uses a constellation diagram regarding modulation and related calculations to achieve the objectives of high precision noise estimation.

2. Description of the Prior Art

In the fields of electronics and communications, noise is always inevitable. Since noise is not able to be wholly separated from either an electronic system or a communication system, it is very helpful to a following signal process if current noise in a system can be estimated.

A constellation diagram is a representation of a signal modulated by a digital modulation scheme such as quadrature amplitude modulation (QAM) or phase-shift keying (PSK), both of which are often used in communication systems.

Each symbol in a communication signal is firstly mapped to constellation points on a constellation diagram at the transmitting end. However, an actual position on the constellation of the symbol received at the receiving end may deviate from the ideal position of an original mapped constellation point on the constellation diagram because of the existence of noise.

When a communication signal of a communication system is received at the receiving end, a system that performs a demodulation process will determine which constellation point a symbol in the communication signal is mapped to, thereby obtaining information carried by each symbol. A received symbol, however, may be received at the position on the constellation diagram that deviates from the ideal position of the constellation point which the received symbol should be located at, because of a variety of noise, such as an additive white Gaussian noise, or/and a phase noise. In these circumstances, by measuring deviation between the ideal position of the constellation point on the constellation diagram that the symbol is originally mapped to and the actual position where the symbol is received on the constellation diagram, an Euclidean distance is acquired, which can be utilized for estimating an amount of noise existing in the communication system, enabling users to comprehend the extent of distortion and interference in the signal.

A constellation point on the constellation diagram which is the nearest to the actual position of the received symbol will be selected as the demodulation result regarding that received symbol. In other words, a received symbol is evaluated as a certain symbol corresponding to the constellation point whose position is nearest to the position of the received symbol. However, the constellation point selected in the demodulation process is probably not the same as which the received symbol is originally mapped to. If the influence caused by noise is very serious, the actual position of the received symbol may be too close to other constellation points on the constellation diagram and therefore the received symbol will be evaluated as the symbol that is mapped to another constellation point at the transmitting end rather than the original constellation point.

Figure 1:
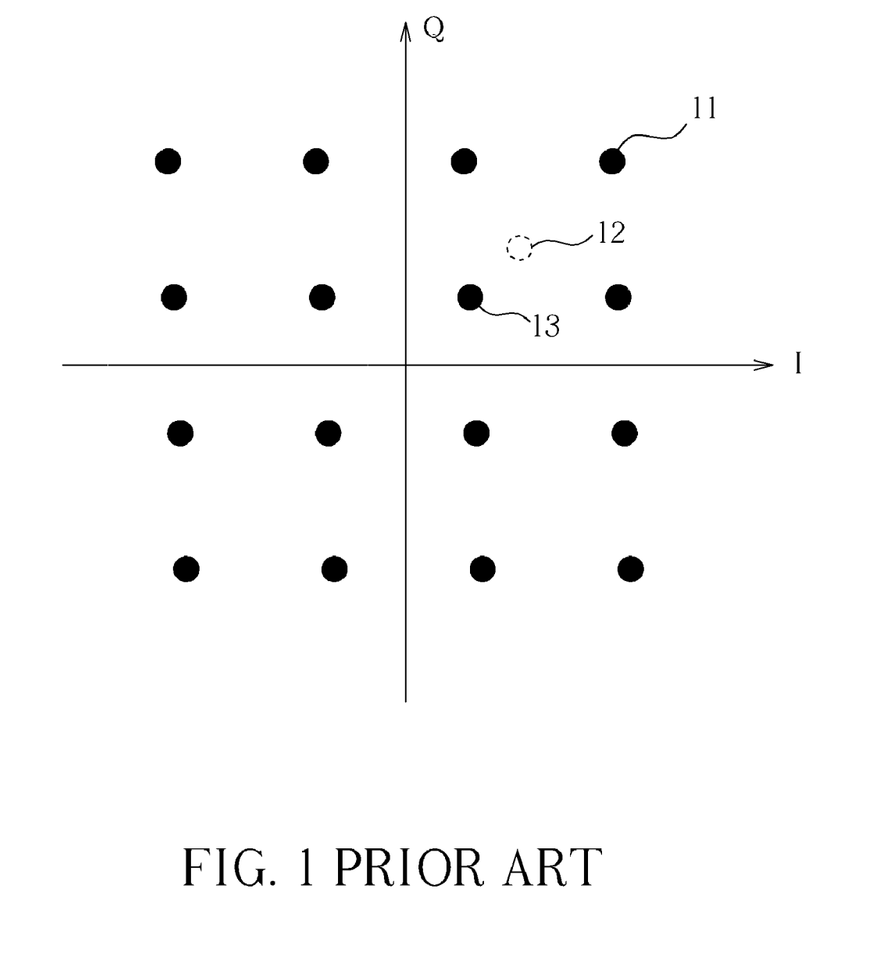
FIG. 1 is a diagram showing mapping of a constellation diagram corresponding to a 16-QAM.

Detailed descriptions about the inaccuracy of noise estimation caused by the above-mentioned mistaken evaluation for received symbols are explained in the following. Please refer to FIG. 1, which illustrates symbol mapping corresponding to a 16-QAM on a constellation diagram. A certain symbol is mapped to the constellation point 11 on the constellation diagram at the transmitting end. However, that symbol is actually received at the point 12 on the constellation diagram at the receiving end, which is caused by some kind of noise. Thus, the Euclidean distance between the constellation point 11 and the point 12 can theoretically be measured and used to calculate the noise power. However, the actual position of the received symbol is so close to the constellation point 13 that a slicer at the receiving end wrongly evaluates the received symbol as the symbol corresponding to the constellation point 13, which becomes a mistaken evaluation. Noise in the system is underestimated since the mistaken Euclidean distance between the constellation point 13 and the point 12 will be utilized for calculating noise power rather than the correct Euclidean distance between the constellation point 11 and the point 12, which further causes an underestimation of noise power.

SUMMARY OF THE INVENTION

It is therefore one objective of the present invention to provide a noise estimation apparatus and a related method thereof which have the ability of reducing inaccuracy of noise estimation caused by mistaken evaluations of received symbols.

A noise estimation apparatus is provided in accordance with one aspect of the present invention. The noise estimation apparatus comprises an evaluation circuit, a first calculation circuit, a second calculation circuit, and a mean calculation circuit. The evaluation circuit is employed for determining which constellation point on a constellation diagram each received symbol in a communication signal corresponds to for purposes of generating a relevant evaluated symbol and outputting an evaluated signal. The first calculation circuit which is coupled to the evaluation circuit is employed for generating an error output signal according to the communication signal and the evaluated signal, wherein the error output signal comprises a plurality of error calculation values respectively corresponding to errors between a plurality of received symbols in the communication signal and a plurality of relevant evaluated symbols in the evaluated signal. The second calculation circuit which is coupled to the first calculation circuit is employed for adjusting at least a portion of the plurality of error calculation values in the error output signal to generate an adjusted error output signal. The mean calculation circuit which is coupled to the second calculation circuit is employed for performing mean calculation according to the adjusted error output signal to generate a noise estimation result.

According to another aspect of the present invention, a related noise estimation method is provided. The noise estimation method comprises: determining which constellation point on a constellation diagram each received symbol in a communication signal corresponds to for purposes of generating a relevant evaluated symbol and outputting an evaluated signal; generating an error output signal according to the communication signal and the evaluated signal, wherein the error output signal comprises a plurality of error calculation values respectively corresponding to errors between a plurality of received symbols in the communication signal and a plurality of relevant evaluated symbols in the evaluated signal; adjusting at least a portion of the plurality of error calculation values in the error output signal to generate an adjusted error output signal; and performing mean calculation according to the adjusted error output signal to generate a noise estimation result.

These and other objectives of the present invention will no doubt become obvious to those of ordinary skill in the art after

DETAILED DESCRIPTION

Figure 2:
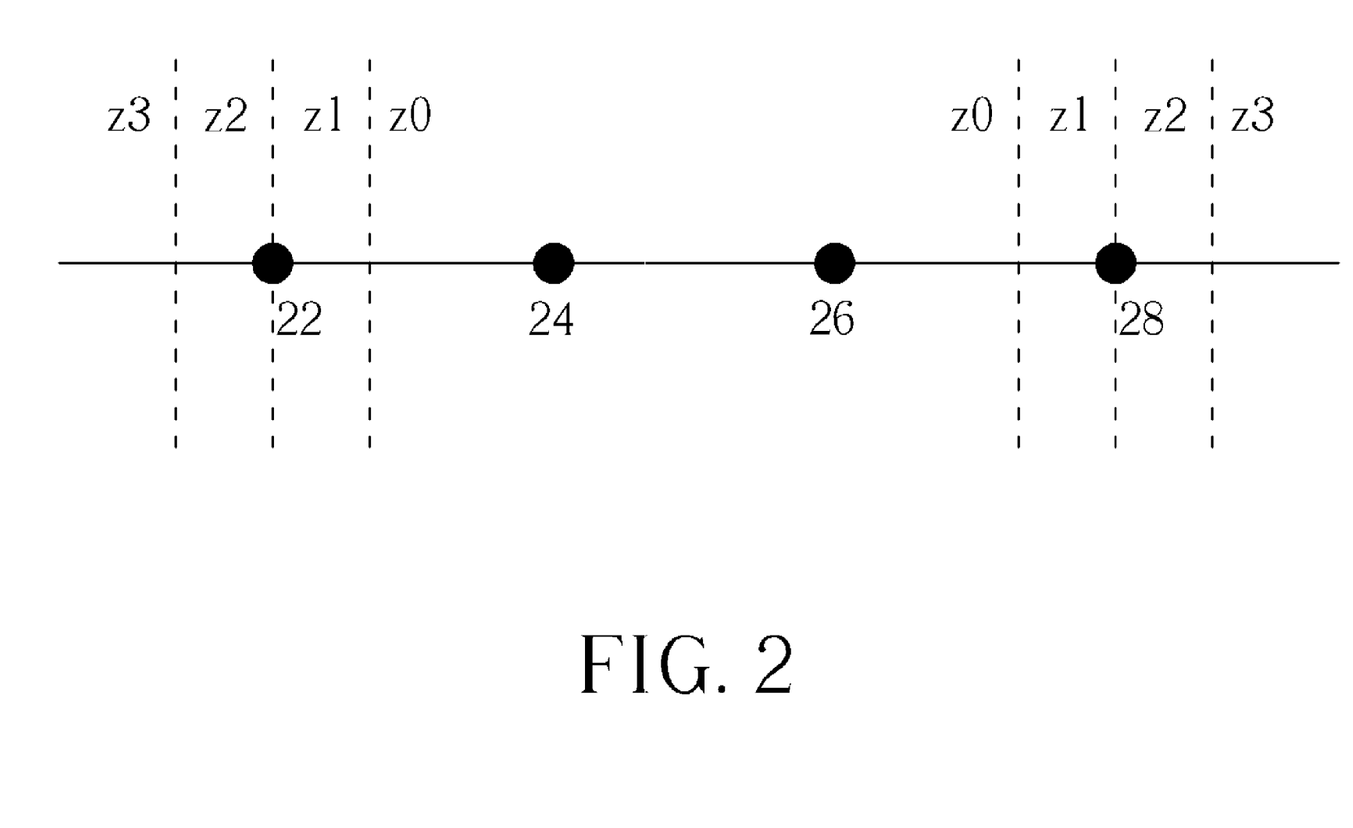
FIG. 2 is a diagram showing mapping of a constellation diagram corresponding to a 4-PAM.

Please refer to FIG. 2, which illustrates the mapping relationship regarding a constellation diagram representing 4-pulse amplitude modulation (4-PAM). If a symbol is mapped to the constellation point 28 on the constellation diagram shown in FIG. 2 at the transmitting end, the actual position where the symbol is received at the receiving end may deviate from the constellation point 28 due to noise interference. The possible range on the constellation diagram where that received symbol may be deviated to is divided into four zones: z0, z1, z2, and z3. Zone z0 and zone z1 are two opposite sides against the center line of the constellation point 26 and the constellation point 28. If the actual position of that received symbol deviates to fall within zone z0 due to noise, the slicer at the receiving end will evaluate that received symbol as the symbol that corresponds to the constellation point 26, causing a mistaken evaluation. The mistaken evaluation not only misunderstands the information carried by that received symbol but also causes a negative influence on noise estimation.

If, however, the actual position of that received symbol is deviated to fall within zone z1, zone z2, or zone z3, the slicer at the receiving end will make no mistaken evaluation and correctly evaluate that received symbol as the symbol that corresponds to the constellation point 28. This is similar to the received symbol being originally mapped to the constellation point 22 on the constellation diagram. A mistaken evaluation will only be made by the slicer if the actual position of the received symbol regarding the constellation point 22 falls within zone z0 of the four zones. However, if received symbols are originally mapped to the constellation point 24 and constellation point 26 at the transmitting end, mistaken evaluations for these received symbols will occur more often than received symbols being mapped to the constellation point 22 and the constellation point 28 because of the relative association between deviated zones and constellation points. For example, an actual position of a received symbol that is originally mapped to the constellation point 24 at the transmitting end is probably deviated to zones which are near to the constellation point 22 or the constellation point 26. Therefore, the received symbol may be wrongly evaluated as the symbol that is mapped to the constellation point 22 or the constellation point 26.

As a result, if outer constellation points on the constellation diagram are the only constellation points utilized for estimating the entire noise of a system exclusive of inner constellation points, the accuracy of noise estimation can be increased because of excluding occurrences of mistaken evaluations regarding the inner constellation points. However, if outer constellation points on the constellation diagram are the only constellation points utilized for noise estimation, additional compensation must be performed for unconsidered parts (the amount of noise attached to symbols that are originally mapped to inner constellation points) of noise estimation.

Please refer to the following equation. Equation 1 is:

$$\sigma^2 = E[(|x(n)-d(n)|^2|_{x(n)\in z3})*2*2 + (|x(n)-d(n)|^2|_{x(n)\notin z3})].$$

Equation 1 is utilized for estimating noise in the 4-PAM, wherein $x(n)$ is a parameter representing the actual position of a received symbol on a constellation diagram and $d(n)$ is a parameter representing the position of the constellation point that the received symbol is evaluated as by a slicer (no matter whether the evaluation is mistaken or correct). The difference between $x(n)$ and $d(n)$ is utilized for an approximate calculation of noise. In actuality, the difference between $x(n)$ and $d(n)$ is a vector on the constellation diagram. However, by a proper conversion and calculation, the value of the vector (Euclidean distance) can be utilized for representing noise. Thus, the square value of the amount of the vector can represent noise power, called error calculation value in the following part. Via a mean square calculation, a noise estimation result can be obtained.

Please refer to FIG. 2 again. The present invention only utilizes symbols that are originally mapped to the constellation point 22 and the constellation point 28 at the transmitting end and the relevant deviation distances (relevant to the constellation point 22 and the constellation point 28) between positions of constellation points at which the symbols are actually received and positions of constellation points at which symbols are evaluated at the receiving end. The deviation distances regarding the constellation point 24 and those regarding the constellation point 26 are not utilized for noise estimation (since deviation which occurs at symbols mapped to these two constellation points cause the slicer to make mistaken evaluations more often).

Furthermore, when an actual position of a received symbol is deviated to fall within zone z3, which makes no mistaken evaluations, the relevant error calculation value is of greater importance for noise estimation. However, when an actual position of a received symbol is deviated to fall within zone z0, an incorrect relevant error calculation value (caused by mistaken evaluation of a received symbol) is acquired and the noise power is therefore underestimated. Assuming that the probability of the actual position of the received symbol deviated to fall within zone z0 is equal to the probability of the actual position of the received symbol deviated to fall within zone z3 (based on the characteristic of noise, which will be explained later), the error calculation value relevant to the position of the received symbol deviated to the zone z3 is utilized to replace the error calculation value relevant to the position of the received symbol deviated to the zone z0, which may result in a mistaken evaluation. When the actual position of the received symbol is neither deviated to zone z3 nor zone z0, the relevant error calculation value will not be adjusted anymore. The error calculation value relevant to the position of the received symbol deviated to the zone z3 is scaled by two, which is approximately equal to the summation of the error calculation value relevant to the position of the received symbol deviated to the zone z3 and the error calculation value relevant to the position of the received symbol deviated to the zone z0.

As mentioned above, the result of equation 1 (which is a mean square error value) is only obtained by the relationship of an actual position and a relevant evaluated position of a received symbol corresponding to the constellation point 22 and the constellation point 28, and the error calculation value relevant to the position of the received symbol deviated to the zone z3 corresponding to the constellation point 22, wherein the constellation point 28 is further scaled by two to reconstruct the error calculation values corresponding to the constellation point 24 and the constellation point 26 which is omitted before (therefore, the error calculation values of the received symbols that are deviated to the zone 3 corresponding to the constellation point 22 and the constellation point 28 are doubly scaled by two). Consequently, the entire noise power of a 4-PAM system can be estimated by the means mentioned above.

Figure 3:
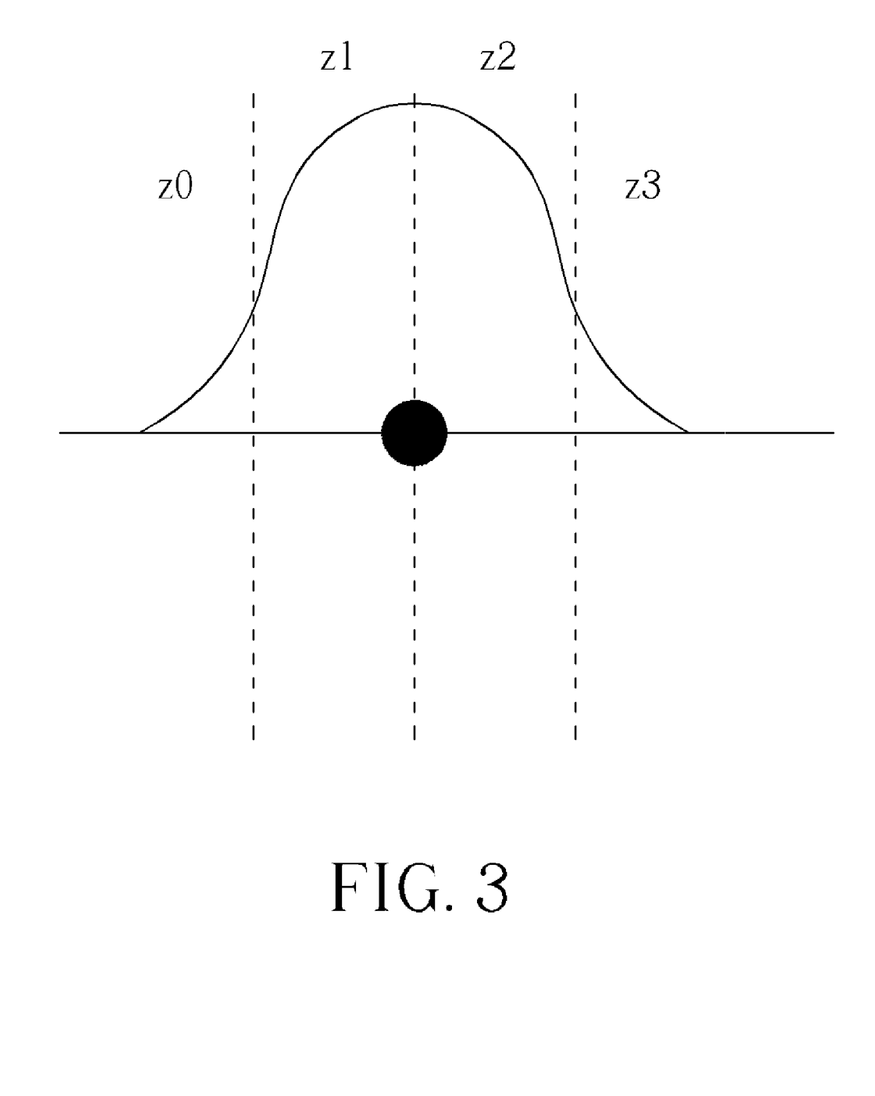
FIG. 3 is a diagram showing probability distribution of deviation regarding the constellation point shown in FIG. 2.

Please note that the reason the error calculation value relevant to the position of the received symbol deviated to the zone z3 is utilized for amending the incorrect error calculation value relevant to the position of the received symbol deviated to the zone z0 is that most noise is of a Gaussian distribution. As shown in FIG. 3, a curve representing the probability distribution regarding each position on the constellation diagram a received symbol may be deviated to, is of a Gaussian distribution. Therefore, the probability of the actual position of the received symbol deviating to fall within zone z0 is equal to the probability of the actual position of the received symbol deviating to fall within zone z3.

Accordingly, equation 1 can be represented in a more general way to be extensively used in any case of digital modulation. Please refer to equation 2:

$$\sigma^2 = E[(|x(n)-d(n)|^2|_{x(n)\in z})*K + (|x(n)-d(n)|^2|_{x(n)\in z'})] \quad (2)$$

Figure 4:
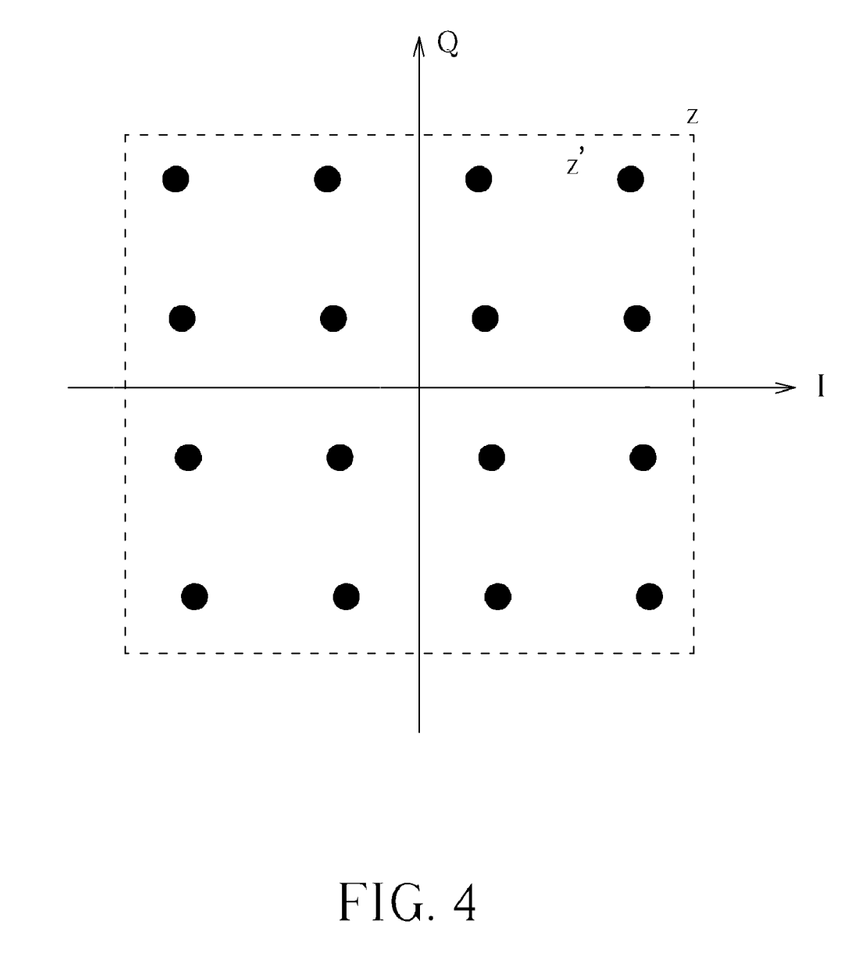
FIG. 4 is a diagram of zone division used in the present invention for a constellation point corresponding to a constellation diagram of a 16-QAM.

The first term on the right side is considered to correspond to the condition that the actual positions of the received symbol regarding the outer constellation points are deviated to fall within the outermost zone relative to all constellation points (similar to the zone z3 in the case of 4-PAM; besides, only symbols regarding the outer constellation points are considered in noise estimation). In equation 2, the "z" represents the outermost zone relative to all constellation points while the "z'" represents the inner zone of the outermost zone (as shown in FIG. 4). Accordingly, the first term scaled by 4 in equation 1 is scaled by a constant K in equation 2 (varying with different digital modulations). As a result, through equation 2, the present invention can be utilized in any general case, which illustrates the idea of the present invention more pertinently.

Figure 5:
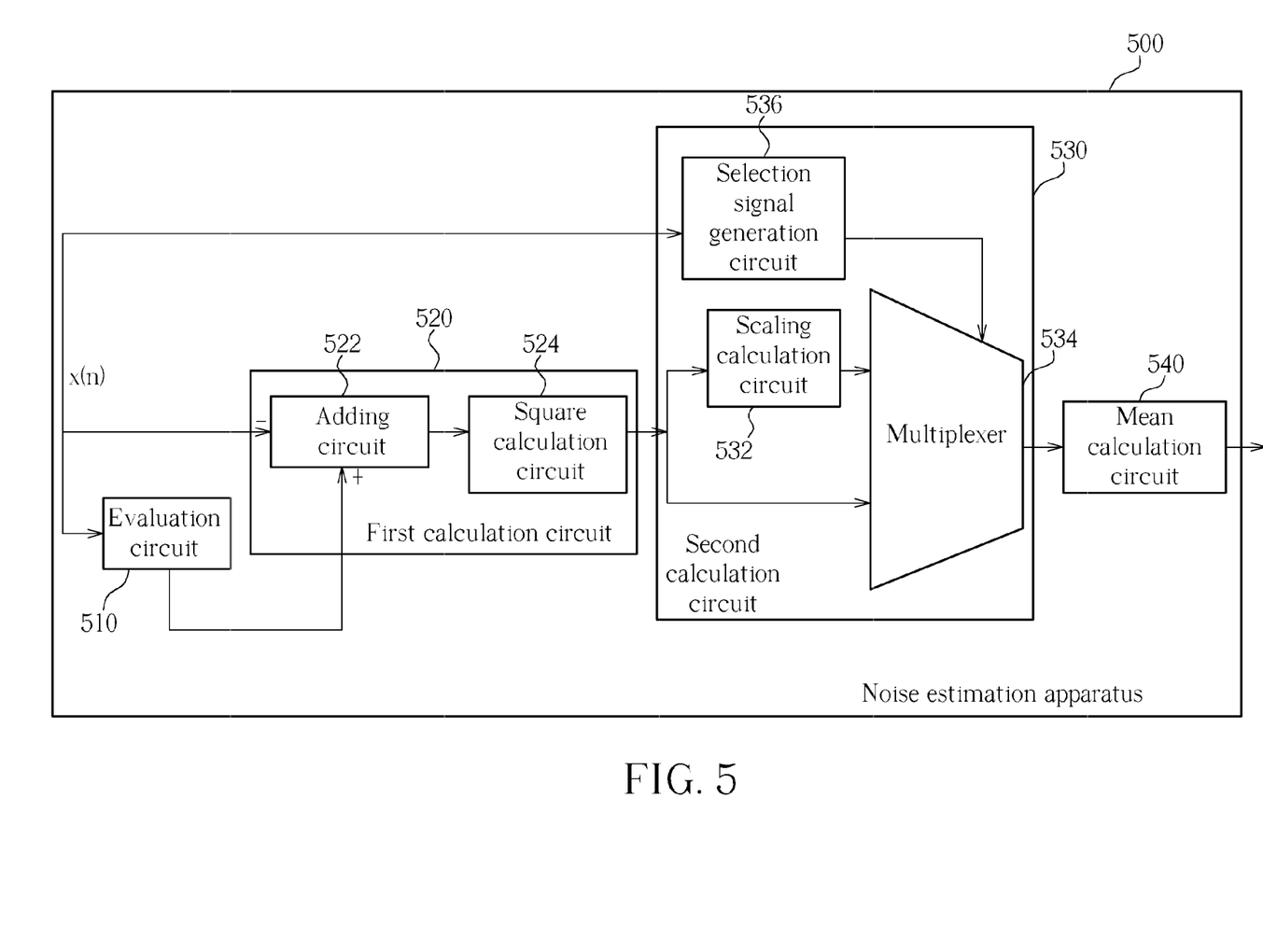
FIG. 5 is a block diagram of a noise estimation apparatus according to one exemplary embodiment of the present invention.

FIG. 5 illustrates a block diagram of a noise estimation apparatus according to one exemplary embodiment of the present invention. The noise estimation apparatus 500 comprises (but is not limited to): an evaluation circuit 510, a first calculation circuit 520, a second calculation circuit 530, and a mean calculation circuit 540. The first calculation circuit 520 comprises an adding circuit 522 which is coupled to the evaluation circuit 510, and the first calculation circuit 520 also comprises a square calculation circuit 524 coupled to the adding circuit 522. The second calculation circuit 530 comprises a scaling calculation circuit 532, a multiplexer 534, and a selection signal generation circuit 536.

Please continue to refer to FIG. 5. When a receiving end of a communication system receives a communication signal, in a demodulation process, a received symbol in the communication signal will be mapped to a constellation point on the constellation diagram. The evaluation circuit 510 (which can be implemented with a conventional slicer) is utilized for evaluating the received symbol as a constellation point on the constellation diagram, thereby obtaining a evaluated symbol (depending on which constellation point the actual position of the received symbol is closest to). Due to noise, the actual position of the received symbol will deviate from the constellation point that the received symbol is originally mapped to at the transmitting end.

The adding circuit 522 is utilized for performing a subtraction calculation for measuring the Euclidean distance between the position of a received symbol and the position of an evaluated symbol on the constellation diagram, which acquires an error value. The error value is further squared by the square calculation circuit 524 to get an error calculation value since the noise is typically considered as a form of power (which means the Euclidean distance needs to be squared).

The error calculation value is transmitted to the second calculation circuit 530 and is scaled by a constant factor by means of the scaling calculation circuit 532 as in the first term on the right side of equation 2. As the actual position of the received symbol that is originally mapped to the outermost constellation point when at the transmitting end is deviated to the outermost zone of all constellation points when at the receiving end, the corresponding error calculation value will be scaled by constant K in order to adjust the entire error calculation values.

As expressed in equation 2, the only condition that needs to be considered is when the position of a received symbol is deviated to the outermost scope of the constellation diagram, and a scaling calculation is performed on the relevant error calculation value, and a mean calculation is then performed. The multiplexer 534 is employed for determining whether an error calculation value needs to be scaled before being transmitted into the mean calculation circuit 540.

The selection signal generation circuit 536 initially observes a received symbol to ascertain whether the actual position of the received symbol is deviated to fall within the zone z or the zone z' in order to configure the control value of the selection signal of the multiplexer 534. If an actual position of a received symbol is deviated to zone z, the control value of the selection signal causes the error calculation value scaled by the constant K to be transmitted to the mean calculation circuit 540; if the actual position of the received symbol is deviated to zone z', the control value of the selection signal causes the error calculation value which has not been scaled to be transmitted to the mean calculation circuit 540. Therefore, the idea disclosed by the present invention is that a more accurate noise power (mean square value) is obtained by adjusting the error calculation value which corresponds to the received symbol falling within a specific scope.

Figure 6:
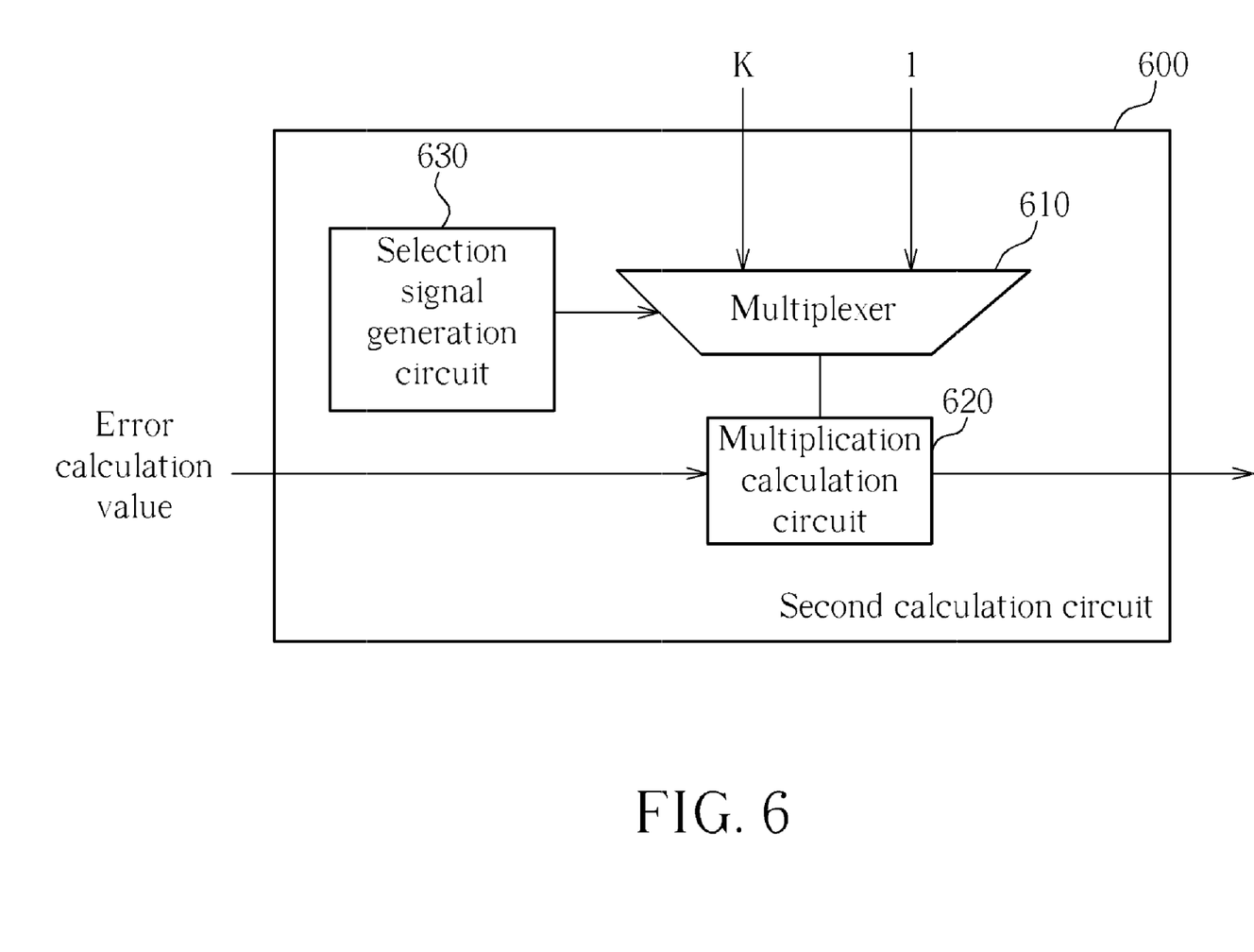
FIG. 6 is a block diagram of a second calculation circuit in a noise estimation apparatus of the present invention according to another exemplary embodiment.

However, the circuit scheme of the second calculation of the present invention is not merely limited to that shown in FIG. 5 and other implementations also fall within the scope of the present invention. Please refer to FIG. 6, which illustrates a block diagram of a second calculation circuit according to another exemplary embodiment of the present invention. In this exemplary embodiment, a second calculation circuit comprises (but is not limited to) a multiplexer 610, a multiplication calculation circuit 620, and a selection signal generation circuit 630. Similarly to the exemplary embodiment shown in FIG. 5, the selection signal generation circuit 630 configures the control value of the selection signal of the multiplexer 610 according to the actual position on the constellation diagram where each received symbol is exactly received at the receiving end. If the actual position of a received symbol is deviated to zone z, the selection signal generation circuit 630 configures the control value of the selection signal to be the value that makes the multiplexer 610 output a constant K, thereby making the corresponding error calculation value scaled by the constant K, then the scaled error calculation value is output to a mean calculation circuit (not shown); if the actual position of a received symbol is deviated to zone z', the selection signal generation circuit 630 configures the control value of the selection signal to be a value that makes the multiplexer 610 output "1", thereby making the corresponding error calculation value not be scaled, then the original error calculation value is directly output to a mean calculation circuit (not shown). Consequently, a portion of error calculation values are adjusted to compensate the entire error calculation values, thereby increasing the accuracy of noise estimation.

As mentioned above, the noise estimation method executed by the noise estimation apparatus 500 of the present invention can be summarized as follows: determining which constellation point on a constellation diagram each received symbol in a communication signal corresponds to for purposes of generating a relevant evaluated symbol and outputting a evaluated signal; generating an error output signal according to the communication signal and the evaluated signal, wherein the error output signal comprises a plurality of error calculation values respectively corresponding to errors between a plurality of received symbols in the communication signal and a plurality of relevant evaluated symbols in the evaluated signal; adjusting at least a portion of error calculation values in the error output signal to generate an adjusted error output signal; and performing mean calculation according to the adjusted error output signal to generate a noise estimation result.

The step of generating an error output signal according to the communication signal and the evaluated signal is represented by the term $|x(n)-d(n)|^2$ in equation 2, acquiring each relevant error calculation value regarding each symbol. The step of adjusting at least a portion of error calculation values in the error output signal to generate an adjusted error output signal is one principle of the present invention where the error calculation value between the received symbol and the evaluated symbol is scaled by a constant factor and the error calculation value is not further processed when the actual position of the received symbol regarding the outer constellation point has not deviated to fall within the outermost zone.

By observing the deviation distance between the actual position and the evaluation position (the position of the evaluated symbol) of a received symbol, the error calculation value corresponding to each received symbol can be obtained and all the error calculation values can selectively be scaled. Then, all error calculation values are performed with a mean calculation to obtain noise estimation as expressed in equation 2.

In conclusion, the primary idea of the present invention includes two aspects. First, only symbols regarding the outer constellation points are utilized for calculating mean noise power of the entire system. Underestimation of noise power due to mistaken evaluations of received symbols can therefore be avoided. Second, in order to use the error calculation values regarding the outer constellation points and compensate the amount of error calculation values corresponding to the inner constellation points that are omitted, the error calculation values that correspond to the positions of received symbols falling within a specific scope are properly scaled. By the said two aspects, the noise estimation apparatus and related method can increase the accuracy of noise estimation. It should be noted that the constant utilized for scaling error calculation values can be obtained by experiment or by other means, but how to determine it is not emphasized by the present invention and is not discussed in detail here.

Those skilled in the art will readily observe that numerous modifications and alterations of the device and method may be made while retaining the teachings of the invention.

What is claimed is:

1. A noise estimation apparatus, comprising:
    an evaluation circuit, for determining which constellation point on a constellation diagram each received symbol in a communication signal corresponds to for purposes of generating a relevant evaluated symbol and outputting an evaluated signal;
    a first calculation circuit, coupled to the evaluation circuit, for generating an error output signal according to the communication signal and the evaluated signal, wherein the error output signal comprises a plurality of error calculation values respectively corresponding to errors between a plurality of received symbols in the communication signal and a plurality of relevant evaluated symbols in the evaluated signal;
    a second calculation circuit, coupled to the first calculation circuit, for adjusting at least a portion of the plurality of error calculation values in the error output signal to generate an adjusted error output signal; and
    a mean calculation circuit, coupled to the second calculation circuit, for performing mean calculation according to the adjusted error output signal to generate a noise estimation result.

2. The noise estimation apparatus of claim 1, wherein the first calculation circuit comprises:
    an adding circuit, for performing subtraction calculations on the plurality of received symbols in the communication signal and the plurality of relevant evaluated symbols in the evaluated signal to generate a plurality of error values, respectively; and
    a square calculation circuit, coupled to the adding circuit, for performing square calculations respectively on the plurality of error values output by the adding circuit to generate the plurality of error calculation values.

3. The noise estimation apparatus of claim 1, wherein the adjusted error output signal output by the second calculation circuit comprises a plurality of first output values and a plurality of second output values, and the second calculation circuit outputs a first portion of the plurality of error calculation values directly as the plurality of first output values and adjusts a second portion of the plurality of error calculation values to generate the plurality of second output values.

4. The noise estimation apparatus of claim 3, wherein the second calculation circuit comprises:
    a scaling calculation circuit, for scaling the plurality of error calculation values to generate a plurality of scaled error calculation values;
    a multiplexer, having a first input port and a second input port respectively coupled to the first calculation circuit and the scaling calculation circuit, for selecting one of the first input port and the second input port to be coupled to an output port of the multiplexer according to a selection signal, wherein the multiplexer selects the first portion of the plurality of the error calculation values to be output as the plurality of first output values when the selection signal possesses a first control value, and the multiplexer selects the scaled error calculation values relevant to the second portion of the plurality of error calculation values from the plurality of scaled error output values to be output as the plurality of second output values when the selection signal possesses a second control value; and a selection signal generation circuit, coupled to the multiplexer, for configuring the selection signal to possess a first control value or a second control value according to the communication signal.

5. The noise estimation apparatus of claim 4, wherein the selection signal generation circuit configures the selection signal to possess the first control value when ascertaining that a received symbol in the communication signal falls within a specific scope of the constellation diagram while the selection signal generation circuit configures the selection signal to possess the second control value when ascertaining that the received symbol in the communication signal does not fall within the specific scope of the constellation diagram.

6. The noise estimation apparatus of claim 3, wherein the second calculation circuit comprises:

a multiplexer, having a first input port and a second input port respectively coupled to a first constant and a second constant, for selecting one of the first input port and the second input port to be coupled to an output port of the multiplexer according to a selection signal, wherein the multiplexer selects to output the first constant when the selection signal possesses a first control value and the multiplexer selects to output the second constant when the selection signal possesses a second control value;

a multiplication calculation circuit, coupled to the output port of the multiplexer, for performing multiplication calculations on the first constant output by the multiplexer and the first portion of error calculation values to generate the plurality of first output values, and performing multiplication calculations on the second constant output by the multiplexer and the second portion of error calculation values to generate the plurality of second output values; and a selection signal generation circuit, coupled to the multiplexer, for configuring the selection signal to possess the first control value or the second control value according to the communication signal.

7. The noise estimation apparatus of claim 6, wherein the selection signal generation circuit configures the selection signal to possess the first control value when ascertaining that a received symbol in the communication signal falls within a specific scope of the constellation diagram and the selection signal generation circuit configures the selection signal to possess the second control value when ascertaining that the received symbol in the communication signal does not fall within the specific scope of the constellation diagram.

8. A noise estimation method, comprising:

determining which constellation point on a constellation diagram each received symbol in a communication signal corresponds to for purposes of generating a relevant evaluated symbol and outputting a evaluated signal;

generating an error output signal according to the communication signal and the evaluated signal, wherein the error output signal comprises a plurality of error calculation values respectively corresponding to errors between a plurality of received symbols in the communication signal and a plurality of relevant evaluated symbols in the evaluated signal;

adjusting at least a portion of the plurality of error calculation values in the error output signal to generate an adjusted error output signal; and performing a mean calculation according to the adjusted error output signal to generate a noise estimation result.

9. The noise estimation method of claim 8, wherein the step of generating an error output signal according to the communication signal and the evaluated signal comprises:

performing subtraction calculations on the plurality of received symbols in the communication signal and the plurality of relevant evaluated symbols in the evaluated signal to generate a plurality of error values, respectively; and performing square calculations on the plurality of error values to generate the plurality of error calculation values.

10. The noise estimation method of claim 8, wherein the adjusted error output signal comprises a plurality of first output values and a plurality of second output values, and the step of adjusting at least a portion of error calculation values in the error output signal to generate the adjusted error output signal comprises:

outputting a first portion of the plurality of error calculation values directly as the plurality of first output values; and adjusting a second portion of the plurality of error calculation values to generate the plurality of second output values.

11. The noise estimation method of claim 10, wherein the step of outputting the first portion of the plurality of error calculation values directly as the plurality of first output values and adjusting the second portion of the plurality of error calculation values to generate the plurality of second output values comprises:

scaling the plurality of error calculation values to generate a plurality of scaled error calculation values;

multiplexing the plurality of scaled error calculation values and the plurality of error calculation values to output the plurality of first output values and the plurality of second output values according to a selection signal, wherein the first portion of the plurality of the error calculation values are selected to be output as the plurality of first output values when the selection signal possesses a first control value and the scaled error calculation values relevant to the second portion of the plurality of error calculation values from the plurality of scaled error output values are selected to be output as the plurality of second output values when the selection signal possesses a second control value; and configuring the selection signal to possess a first control value or a second control value according to the communication signal.

12. The noise estimation method of claim 11, wherein the step of configuring the selection signal to possess the first control value or the second control value according to the communication signal comprises:

configuring the selection signal to possess the first control value when ascertaining that a received symbol in the communication signal falls within a specific scope of the constellation diagram; and configuring the selection signal to possess the second control value when ascertaining that the received symbol in the communication signal does not fall within the specific scope of the constellation diagram.

13. The noise estimation method of claim 10, wherein the step of outputting the first portion of the plurality of error calculation values directly as the plurality of first output values and adjusting the second portion of the plurality of error calculation values to generate the plurality of second output values comprises:

performing a multiplexing operation to selectively output one of a first constant and a second constant according to a selection signal, wherein the first constant is output when the selection signal possesses a first control value and the second constant is output when the selection signal possesses a second control value; and performing multiplication calculations on the first constant and the first portion of error calculation values to generate the plurality of first output values, and performing multiplication calculations on the second constant and the second portion of error calculation values to generate the plurality of second output values; and configuring the selection signal to possess the first control value or the second control value according to the communication signal.

14. The noise estimation method of claim 13, wherein the step of configuring the selection signal to possess the first control value or the second control value according to the communication signal comprises:

configuring the selection signal to possess the first control value when ascertaining that a received symbol in the communication signal falls within a specific scope of the constellation diagram; and configuring the selection signal to possess the second control value when ascertaining that the received symbol in the communication signal does not fall within the specific scope of the constellation diagram.

* * * * *